US009556298B2

(12) United States Patent
Hintzer et al.

(10) Patent No.: US 9,556,298 B2
(45) Date of Patent: Jan. 31, 2017

(54) METHOD OF MAKING FLUOROPOLYMERS WITH A POLYIODIDE, COMPOSITIONS AND ARTICLES THEREOF

(71) Applicant: 3M INNOVATIVE PROPERTIES COMPANY, St. Paul, MN (US)

(72) Inventors: Klaus Hintzer, Kastl (DE); Florian D. Jochum, Neuoetting (DE); Harald Kaspar, Burgkirchen (DE); Kai H. Lochhaas, Neuoetting (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/650,091

(22) PCT Filed: Nov. 27, 2013

(86) PCT No.: PCT/US2013/072143
§ 371 (c)(1),
(2) Date: Jun. 5, 2015

(87) PCT Pub. No.: WO2014/099311
PCT Pub. Date: Jun. 26, 2014

(65) Prior Publication Data
US 2015/0344605 A1    Dec. 3, 2015

Related U.S. Application Data

(60) Provisional application No. 61/739,097, filed on Dec. 19, 2012, provisional application No. 61/771,320, filed on Mar. 1, 2013.

(51) Int. Cl.
| C08F 14/16 | (2006.01) |
| C08F 214/22 | (2006.01) |
| C08F 14/18 | (2006.01) |
| C08F 14/26 | (2006.01) |
| C08F 2/16 | (2006.01) |
| C08F 214/26 | (2006.01) |

(52) U.S. Cl.
CPC .......... *C08F 214/222* (2013.01); *C08F 2/16* (2013.01); *C08F 14/16* (2013.01); *C08F 14/18* (2013.01); *C08F 14/26* (2013.01); *C08F 214/262* (2013.01)

(58) Field of Classification Search
None
See application file for complete search history.

(56) References Cited

U.S. PATENT DOCUMENTS

| 4,243,770 | A | 1/1981 | Tatemoto |
| 4,766,190 | A | 8/1988 | Morita |
| 4,948,852 | A | 8/1990 | Moore |
| 5,173,553 | A | 12/1992 | Albano |
| 5,231,154 | A | 7/1993 | Hung |
| 5,585,449 | A | 12/1996 | Arcella |
| 5,625,019 | A | 4/1997 | Arcella |
| 5,717,036 | A | 2/1998 | Saito |
| 6,111,028 | A | 8/2000 | Brinati |
| 6,150,565 | A | 11/2000 | Yang |
| 6,228,943 | B1 | 5/2001 | Morikawa |
| 6,429,258 | B1 | 8/2002 | Morgan |
| 6,566,471 | B1 | 5/2003 | Arcella |
| 6,646,077 | B1 | 11/2003 | Lyons |
| 6,825,300 | B2 * | 11/2004 | Grootaert ............... C08F 14/18 526/217 |
| 7,671,112 | B2 | 3/2010 | Hintzer |
| 2002/0103304 | A1 | 8/2002 | Hintzer |
| 2003/0166807 | A1 * | 9/2003 | Harrison ............... C08F 214/22 526/206 |
| 2004/0127661 | A1 * | 7/2004 | Kaspar ..................... C08F 8/30 526/247 |
| 2007/0015937 | A1 | 1/2007 | Hintzer |
| 2010/0286329 | A1 | 11/2010 | Fukushi |

FOREIGN PATENT DOCUMENTS

| EP | 0373588 | 6/1990 |
| EP | 0407937 | 1/1991 |
| EP | 0518073 | 12/1992 |
| EP | 0769521 | 4/1997 |
| EP | 0838482 | 4/1998 |
| EP | 0979832 | 2/2000 |
| EP | 1548038 | 6/2005 |
| WO | WO 2014-088804 | 6/2014 |
| WO | WO 2014-088820 | 6/2014 |

OTHER PUBLICATIONS

Ameduri, Journal of Fluorine Chemistry, 100 (1999) 97-116.*

(Continued)

*Primary Examiner* — Robert C Boyle
(74) *Attorney, Agent, or Firm* — Julie Lapos-Kuchar

(57) ABSTRACT

Described herein is a method of making a fluoropolymer and fluoropolymers thereof, wherein the method comprises: (a) providing an aqueous solution comprising a water soluble polyiodide salt of Formula (I): $M^{+y}[I\text{—}I\text{—}(I)_n]_y^-$ wherein M is a cation group having a valence y, y is an integer of at least 1 and n is an integer of at least 1; and (b) initiating polymerization of a monomer in the aqueous solution, wherein the monomer is a fluorinated monomer.

10 Claims, No Drawings

(56) References Cited

OTHER PUBLICATIONS

Apostolo, "Microemulsion Polymerization for Producing Fluorinated Structured Materials", Macromolecular Symposia, 2004, vol. 206, Issue 1, pp. 347-360.
Balague, "Synthese de telomeres fluores Partie III. Telomerisation de l'hexafluoropropene avec des iodures de perfluoroalkyle", Journal of Fluorine Chemistry, 1995, vol. 74, pp. 49-58.
Boyer, "Iodine Transfer Polymerization (ITP) of Vinylidene Fluoride (VDF). Influence of the Defect of VDF Chaining on the Control of ITP", Macromolecules, 2005, vol. 38, pp. 10353-10362.
Boyer, "Kinetics of the Iodine Transfer Polymerization of Vinylidene Fluoride", Journal of Polymer Science: Part A: Polymer Chemistry, 2006, vol. 44, pp. 5763-5777.
Comino, "New Peroxide Curable Perfluoroelastomer for High Temperature Applications", Progress in Rubber and Plastics Technology, 2001, vol. 17, No. 2, pp. 101-111.
Garcia-Franco, "Similarities Between Gelation and Long Chain Branching Viscoelastic Behavior", Macromolecules 2001, vol. 34, No. 10, pp. 3115-3117.
Shroff, "Assessment of NMR and Rheology for the Characterization of LCB in Essentially Linear Polyethylenes", Macromolecules, 2001, vol. 34, pp. 7362-7367.
Shroff, "Long-Chain-Branching Index for Essentially Linear Polyethylenes", Macromolecules, 1999, vol. 32, pp. 8454-8464.
Stange, "Linear Rheological Properties of the Semifluorinated Copolymer Tetrafluoroethylene-Hexafluoropropylene-Vinylidenfluoride (THV) with Controlled Amounts of Long-Chain Branching", Macromolecules, 2007, vol. 40, pp. 2409-2416.
Wood-Adams, "Effect of Molecular Structure on the Linear Viscoelastic Behavior of Polyethylene", Macromolecules, 2000, vol. 33, pp. 7489-7499.
International Search Report for PCT Application No. PCT/US2013/072143 mailed on Jan. 30, 2014, 3 pages.

\* cited by examiner

METHOD OF MAKING FLUOROPOLYMERS WITH A POLYIODIDE, COMPOSITIONS AND ARTICLES THEREOF

CROSS REFERENCE TO RELATED APPLICATIONS

This application is a national stage filing under 35 U.S.C. 371 of PCT/US2013/072143, filed Nov. 27, 2013, which claims priority to U.S. Provisional Application Nos. 61/771,320, filed Mar. 1, 2013, and 61/739,097, filed Dec. 19, 2012, the disclosures of which are incorporated by reference in their entirety herein.

TECHNICAL FIELD

A process for making a fluoropolymer is described, wherein a fluorinated olefinic monomer is polymerized in the presence of a polyiodide.

SUMMARY

There is a desire to identify alternate methods of making fluoropolymers, which are easier and/or are lower cost to manufacture while providing sufficient iodine introduction into the fluoropolymer.

In one aspect, a method of making a fluoropolymer is described comprising:

(a) providing an aqueous solution comprising a water soluble polyiodide salt of Formula (I):

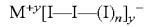

wherein M is a cation group having a valence y, y is an integer of at least 1 and n is an integer of at least 1; and (b) initiating polymerization of a monomer in the aqueous solution, wherein the monomer is a fluorinated monomer.

In another aspect, a fluoropolymer is described which is obtainable by polymerizing a fluorinated monomer in the presence of a water soluble polyiodide salt of Formula (I):

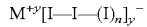

wherein M is a cation group having a valence y, y is an integer of at least 1 and n is an integer of at least 1.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present application is directed towards the polymerization of fluoropolymers, specifically towards fluoroelastomers and semi-crystalline fluoropolymers having a melting point above 115, 150, 200, or even 250° C. and no greater than 300 or 310° C.

Fluoroelastomers are heat stable and resistant to a wide range of chemical reagents. For this reason fluoroelastomers are typically used for making O-rings, gaskets, oil seals, diaphragms, hoses, tubings, rolls and sheeting materials, in particular in the automotive industry and chemical industry.

Fluoroelastomers are typically obtained by curing (cross-linking) a generally amorphous fluoropolymer. To achieve sufficient cross-linking, the amorphous fluoropolymers contain cure sites, which are reactive groups that can undergo cross-linking reactions in the presence of suitable cross-linking agents.

A commonly used cure system is based on a peroxide cure reaction using appropriate curing compounds having or creating peroxides, which in turn are believed to generate free radicals. The fluoroelastomers suitable for use in peroxide curing systems (peroxide curable fluoroelastomers) contain reactive sites which include halogens, such as bromine and/or iodine. It is generally believed that the bromine or iodine atoms are abstracted in the free radical peroxide cure reaction, thereby causing the fluoropolymer molecules to cross-link and to form a three dimensional network.

Terminal iodine groups may be introduced into the polymer during the polymerization using, for example, organic chain transfer agents (such as $CF_2I_2$ or $ICF_2CF_2CF_2I$), and/or fluorinated cure site monomers, both of which tend to introduce a sufficient amount of iodine into the fluoropolymer. However, these fluorinated compounds are sometimes expensive. Furthermore, because they are typically not very water soluble, when doing an aqueous polymerization, co-solvents are needed to introduce these fluorinated compounds into the reaction vessel. Additionally, fluorinated emulsifiers are used during the polymerization to assist with the solubility issues of the fluorinated compounds. This poses a disadvantage in manufacturing because solvents have to be removed and recycled which increases the cost of the polymerization and the emulsifiers are desirably removed from the resulting fluoropolymer, which leads to increased process steps and costs as well.

U.S. Pat. No. 5,173,553 discloses a process for preparing fluoroelastomers, wherein fluorinated monomers are polymerized in the presence of: HI, HBr, iodides and bromides of the metals belonging to groups I and II A and B of the Periodic table, or belonging to groups III and IV B of the Periodic table. Although this method can be done in an aqueous emulsion, there is little incorporation of the halogen into the polymer. For example, at most one iodine or bromine atom incorporated per polymeric chain.

In the present disclosure, Applicants have discovered that by using a water soluble polyiodide salt or complex, the above-mentioned issues can be solved, namely the polyiodide salt or complex is soluble in water, eliminating or reducing the need for organic solvents and/or fluorinated emulsifiers, while enabling a sufficient amount of iodine to be incorporated into the fluoropolymer.

Polyiodide

Polyiodides are a class of polyhalogen anions, which are composed entirely of iodine atoms. The polyiodide salt or complex of the present disclosure (herein referred to as a polyiodide salt, although it may be a salt or a complex) has a structure according to Formula (I): $M^{+y}[I\text{—}I\text{—}(I)_n]_y^-$ wherein M is a cation group having a valence y, y is an integer of at least 1 and n is an integer of at least 1.

In one embodiment, n is an integer of at least 1 and at most 30. For example, n is 1, 2, 3, or 4.

M is a cation group, which may be organic or inorganic. Exemplary organic groups include quaternary ammonium, such as $NR_4$, $NHR_3$, $NH_2R_2$, $NH_3R$, wherein R is a linear or branched alkyl group, preferably comprising 1-10 carbon atoms. Exemplary inorganic groups include: ammonium ($NH_4$), and an alkali metal (e.g., Li, Na, K, etc.), an alkaline earth metal (e.g., Be, Mg, Ca, Sr, etc.), a metal belonging to groups IB and IIB of the periodic table (e.g., Cu, Ag, Zn, Cd), transition metals, (e.g., Fe, Co, Ni, Ru, Rh, Pd, Pt), or a metal belonging to groups IIIA and IV A of the periodic table (e.g., Al, Ga, Sn, Pb). The variable y in Formula (I) is related to the valency of the cation group. Typically, y is an integer of at least 1 and at most 4.

The polyiodide salt of the present disclosure is water soluble, meaning that at least 1 g, 5 g, 8 g, or even 10 g of the polyiodide salt is soluble in 1 L of water.

Polyiodides can be prepared using techniques known in the art. For example, the polyiodide salt may be formed in situ by adding elemental iodine ($I_2$) to a solution of an iodide salt. In yet another example, elemental iodide can be melted along with an iodide salt to form the polyiodide salt, which can then be solidified and crushed prior to use.

Polymerization

In the present disclosure, monomers are polymerized in the presence of a polyiodide salt. In the present disclosure, the monomer is at least one of a fluorinated monomer, however, additional monomers, such as non-fluorinated monomers or cure site monomers may also be added.

In one embodiment, the partially fluorinated polymer of the present disclosure comprises at least two different interpolymerized monomers.

In one embodiment, at least one of the interpolymerized monomers of the partially fluorinated polymer is vinylidene fluoride (VDF).

A fluorinated monomer is a monomer having a carbon-carbon double bond and comprising at least one fluorine atom. The fluorinated monomer may be perfluorinated (or fully fluorinated) or partially fluorinated (comprising at least one hydrogen atom and one fluorine atom).

Exemplary perfluorinated monomers include: hexafluoropropene (HFP), tetrafluoroethylene (TFE), trifluorochloroethylene (CTFE), perfluoro(alkylvinyl ether), chlorotrifluoroethylene, perfluoro(methyl vinyl ether) (PMVE), perfluoro(propyl vinyl ether) (PPVE), perfluoro(methoxypropyl vinyl ether), perfluoro(ethoxymethyl vinyl ether), perfluoro(propyl allyl ether), perfluoro(methoxypropyl allyl ether), perfluoro(ethoxymethyl allyl ether), $CF_2=CFOCFCF_2CF_2OCF_3$, $CF_2=CFOCF_2OCF_2CF_2CF_3$, $CF_2=CFOCF_2OCF_2CF_3$, $CF_2=CFOCF_2OCF_3$, $CF_2=CFCF_2OCFCF_2CF_2OCF_3$, $CF_2=CFCF_2OCF_2OCF_2CF_2CF_3$, $CF_2=CFCF_2OCF_2OCF_2CF_3$, $CF_2=CFCF_2OCF_2OCF_3$, and combinations thereof.

Exemplary partially fluorinated monomers include: vinyl fluoride (VF), vinylidene fluoride (VDF), pentafluoropropylene (e.g., 2-hydropentafluropropylene), trifluoroethylene, and combinations thereof.

In addition to the fluorinated monomer, non-fluorinated monomers may be added. Exemplary non-fluorinated monomers include: propylene, ethylene, isobutylene, and combinations thereof. Generally, these additional monomers would be used at less than 25 mole percent of the fluoropolymer, preferably less than 10 mole percent, and even less than 3 mole percent.

In one embodiment, a combination of fluorinated monomers is used, wherein the monomers are selected from: TFE and propylene; TFE, propylene, and VDF; VDF and HFP; TFE, VDF, and HFP; TFE and EVE (ethyl vinyl ether); TFE and BE (butyl vinyl ether); TFE, EVE, and BE; and VDF and $CF_2=CFOC_3F_7$; ethylene and HFP; CTFE and VDF; TFE and VDF; TFE, VDF, PMVE, and ethylene; TFE and ethylene; TFE, ethylene, and HFP; TFE, ethylene, and PPVE; TFE, ethylene, HFP, and PPVE; and TFE, VDF, and $CF_2=CFO(CF_2)_3OCF_3$.

Known aqueous polymerization techniques including emulsion polymerization (wherein that polymerization occurs in polymer particles dispersed in water which are electrostatically stabilized by an emulsifier) may be used.

The reactor vessel for use in the polymerization process of the present disclosure is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluorinated monomer(s) and additional monomers may be charged to the reactor vessel. The monomers may be charged batch-wise or in a continuous or semi-continuous manner. The independent rate at which the monomers are added to the kettle will depend on the consumption rate of the particular monomer with time. Preferably, the rate of addition of monomer will equal the rate of consumption of monomer, that is conversion of monomer into polymer.

In one embodiment, a fluorinated surfactant may be used which corresponds to the general formula:

$$Y-R_f-Z-M$$

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Such fluorinated surfactants include fluorinated alkanoic acid and fluorinated alkanoic sulphonic acids and salts thereof, such as ammonium salts of perfluorooctanoic acid and perfluorooctane sulphonic acid. Also contemplated for use in the preparation of the polymers described herein are fluorinated surfactants of the general formula:

$$[R_f-O-L-COO^-]_iX_i^+$$

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3. In one embodiment, the emulsifier is selected from $CF_3-O-(CF_2)_3-O-CHF-CF_2-C(O)OH$ and salts thereof. Specific examples are described in US 2007/0015937, which is incorporated herein by reference.

Also contemplated for use in the preparation of the polymers described herein are fluorinated polyether surfactants, such as described in U.S. Pat. No. 6,429,258.

In yet another embodiment, polymerizable fluorinated emulsifiers according to the following formula can be used in the preparation of the polymers described herein $$X_2C=CX(CF_2)_m(CH_2)_n[O-(CX_2)_p]_q-[O-(CX_2)_r]_s-[O-(CX_2-CX_2)]_t-[(O)_w-(CX_2)_u]_v-[CH_2]_z-Y$$

where X is independently selected from H, F, or $CF_3$; Y is COOM or $SO_3M$; wherein the polymerizable fluorinated emulsifier comprises at least 1 fluorine atom. M is H, an alkali metal (e.g., Na, Ca, etc.), or $NH_4$. Subscript m is 0-6, 0-5, 0-4; 0-3, or even 0-2. Subscript n is 0-6, 0-5, 0-4; 0-3, or even 0-2. Subscript p is at least 1, 2, 3, 4, or even 5; and no more than 20, 10, 8, or even 6. Subscript q is 0-6, 0-5, 0-4; 0-3, or even 0-2. Subscript r is 0-6, 0-5, 0-4; 0-3, or even 0-2. Subscript s is 0-6, 0-5, 0-4; 0-3, or even 0-2. Subscript t is 0-6, 0-5, 0-4; 0-3, or even 0-2. Subscript u is 0-6, 0-5, 0-4; 0-3, or even 0-2. Subscript v is 0-6, 0-5, 0-4; 0-3, or even 0-2. Subscript w is 0 or 1. Subscript z is 0-6, 0-5, 0-4; 0-3, or even 0-2. At least one of m, n, q, s, t, u, v, and z is at least 1. These fluorinated emulsifiers are able to be polymerized into the polymer during the polymerization. Exemplary emulsifiers include fluorinated allyl and vinyl ethers including:

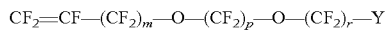

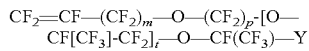

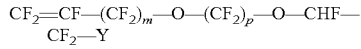

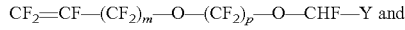

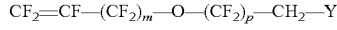

where Y is COOM or $SO_3M$. M is H, an alkali metal, or $NH_4$. Subscript m is an integer from 0-6. Subscript r is an integer from 0-6. Subscript t is an integer from 0-6. Subscript p is an integer from 1-6. Exemplary emulsifiers also include fluorinated olefins such as:

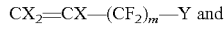

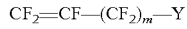

where X is independently selected from H, F, or $CF_3$ and Y is COOM or $SO_3M$. M is H, an alkali metal, or $NH_4$. Subscript m is an integer from 1-6. In one embodiment, at least one of X in the fluorinated olefin is a H. In one embodiment, at least one of X in the fluorinated olefin contains a F atom. These emulsifiers are described in U.S. Pat. Appl. Nos. 61/732,966 and 61/732,967, filed Dec. 4, 2012, herein incorporated by reference.

In one embodiment, the polymerization is substantially free of an emulsifier comprising an acid or salt. Such emulsifiers include fluorinated alkanoic acids and salts thereof; fluorinated alkanoic sulphonic acids and salts thereof; fluoroethoxy alkanoic acids and salts thereof; and combinations thereof. As used here, substantially free of an emulsifier, means less than 0.1%, 0.05%, 0.01%, or even 0.001% by weight of the emulsifier versus the total weight of the dispersion is present, or even no emulsifier is detected in the resulting dispersion.

The polyiodide salts of the present disclosure may be initially charged to the reaction kettle and/or subsequently added in a continuous or semi-continuous way during the polymerization. Typically, the amount of polyiodide added will be at least 0.01, 0.05, or even 0.1% by weight and at most 0.5, 0.75, 1.0 or even 1.5% by weight relative to the total weight of monomers fed into the reaction kettle.

A cure site monomer may also be added to the reaction kettle which are incorporated into the polymer during polymerization and are then used as sites to subsequently crosslink polymer chains. Such cure site monomers may comprise a nitrile-containing group, bromine, and/or iodine. Such cure site monomers are known in the art and can include for example
(a) bromo- or iodo-(per)fluoroalkyl-(per)fluorovinylethers having the formula:

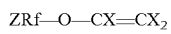

wherein each X may be the same or different and represents H or F, Z is Br or I, Rf is a (per)fluoroalkylene C1-C12, optionally containing chlorine and/or ether oxygen atoms. Suitable examples include $ZCF_2$—O—$CF$=$CF_2$, $ZCF_2CF_2$—O—$CF$=$CF_2$, $ZCF_2CF_2CF_2$—O—$CF$=$CF_2$, $CF_3CFZCF_2$—O—$CF$=$CF_2$, wherein Z represents Br of I; and
(b) bromo- or iodo perfluoroolefins such as those having the formula:

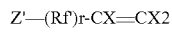

wherein each X independently represents H or F, Z' is Br or I, Rf is a perfluoroalkylene C1-C12, optionally containing chlorine atoms and r is 0 or 1. Examples include: bromo- or iodo-trifluoroethene, 4-bromo-perfluorobutene-1, 4-iodo-perfluorobutene-1, or bromo- or iodo-fluoroolefins such as 1-iodo,2,2-difluoroethene, 1-bromo-2,2-difluoroethene, 4-iodo-3,3,4,4,-tetrafluorobutene-1 and 4-bromo-3,3,4,4-tetrafluorobutene-1; and
(c) non-fluorinated bromo and iodo-olefins such as vinyl bromide, vinyl iodide, 4-bromo-1-butene and 4-iodo-1-butene.

In addition to the cure sites described above, the fluoroelastomers may further contain other cure-sites which may be reactive to peroxide cure systems or which may be reactive to other cure systems for example, but not limited to bisphenol curing systems or triazine curing systems. In the latter case the fluoroelastomer would be curable by a dual cure system or a multi cure system. Examples of such additional cure sites include nitriles, for example nitriles introduced into the polymer from nitrile containing monomers. Examples of nitrile containing monomers that may be used correspond to the following formulae: $CF_2$=$CF$—$CF_2$—O—$Rf$—$CN$; $CF_2$=$CFO(CF_2)_rCN$; $CF_2$=$CFO[CF_2CF(CF_3)O]_p(CF_2)_vOCF(CF_3)CN$; $CF_2$=$CF[OCF_2CF(CF_3)]_kO(CF_2)_uCN$ wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include perfluoro (8-cyano-5-methyl-3,6-dioxa-1-octene), $CF_2$=$CFO(CF_2)_5CN$, and $CF_2$=$CFO(CF_2)_3OCF(CF_3)CN$. Additional cure site monomers include bisolefin cure site monomers, diallyl cure site monomers, and divinyl cure site monomers as are known in the art.

The polymerization is usually initiated after an initial charge of monomer by adding an initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as for example ammonium, sodium or potassium salts. Examples of per-acids include peracetic acid. Esters of the peracid can be used as well and examples thereof include tertiary-butylperoxyacetate and tertiary-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper, and silver may also be added.

During the initiation of the polymerization reaction, the sealed reactor kettle and its contents are conveniently preheated to the reaction temperature. Polymerization temperatures may be from 20° C., from 30° C., or even from 40° C. and may further be up to 100° C., up to 110° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

In one embodiment, the polymerization is conducted in the absence of a diiodo compound of the formula wherein Z is selected from one of an alkyl group, partially fluorinated alkyl group or a perfluorinated alkyl group. Exemplary diiodo compounds include: $ICH_2I$; $ICH_2(CF_2)_zCH_2I$, where z is 0, 1, 2, 3, 4, 5, 6, or even 8; $ICR_2-(CR_2)_z-CR_2I$, wherein R is independently selected from $CF_2$, F, and H, and z is 0, 1, 2, 3, 4, 5, 6, or even 8.

As mentioned previously, because the polyiodide salts are soluble in water, co-solvents may not be necessary. Therefore, in one embodiment, the polymerization and is conducted in the absence of a solvent.

The amount of polymer solids that can be obtained at the end of the polymerization is typically at least 10% by weight, or even at least 20% by weight, and up to 40% by weight, and even up to 45% by weight; and the average particle size of the resulting fluoropolymer is typically between 50 nm and 500 nm.

In one embodiment, the resulting fluoropolymer dispersion is substantially free of a solvent, meaning that less than 1% is present by weight based on the total weight of the dispersion.

In one embodiment, the resulting fluoropolymer dispersion is substantially free of a fluorinated emulsifier, meaning that less than 0.1%, 0.05%, 0.01%, or even 0.001% is present by weight of the fluorinated emulsifier is present based on the total weight of the dispersion.

After polymerization, the polymer dispersion may be coagulated and washed as is known in the art to form a polymer gum.

The resulting polymers of the present disclosure are partially fluorinated polymers, wherein a polymer is a macromolecule having a molecular weight of at least 10000 g/mole. The polymers are partially fluorinated, meaning that they comprise both hydrogen atoms and fluorine atoms along the polymer backbone. In one embodiment, the partially fluorinated polymer of the present disclosure comprises at least 50%, 55%, 60%, or even 65% and no more than 70%, 72%, or even 74% of the atoms being fluorine on a weight basis compared to the total weight of the polymer.

Exemplary fluoropolymers made by the process as disclosed herein include: a TFE/propylene copolymer, a TFE/propylene/VDF copolymer, a VDF/HFP copolymer, a TFENDF/HFP copolymer, a TFE/ethyl vinyl ether (EVE) copolymer, a TFE/butyl vinyl ether (BVE) copolymer, a TFE/EVE/BVE copolymer, a $VDF/CF_2=CFOC_3F_7$ copolymer, an ethylene/HFP copolymer, a CTFE/VDF copolymer, a TFE/VDF copolymer, a TFE/VDF/PMVE/ethylene copolymer, TFE/ethylene copolymer, TFE/ethylene/HFP copolymer, TFE/ethylene/PPVE copolymer, TFE/ethylene/HFP/PPVE copolymer, and a $TFE/VDF/CF_2=CFO(CF_2)_3OCF_3$ copolymer.

The polymers of the present disclosure may be a fluoroelastomer or a semicrystalline fluoropolymer. These iodinated fluoroelastomers or semicrystalline fluoropolymers are versatile building blocks for other high performance polymers (e.g., thermoplastic elastomers).

Semicrystalline fluoropolymers are beneficial for improving bonding of fluorinated polymers to other materials such as silicones and hydrogenated elastomers. Semicrystalline fluoropolymers are particularly useful for multilayer film constructions.

The partially fluorinated polymers of the present disclosure comprise terminal groups. As used herein the term "terminal group" of a polymer comprises both end groups (i.e., groups that are at end positions of the polymer backbone) as well as side groups (i.e., groups that are pending on the backbone of the polymer). The polymer chain will at a minimum comprise two terminal groups (i.e., the two end groups). If the polymer chain comprises branching, than the polymer chain will comprise more than two terminal groups.

It has been discovered that the partially fluorinated polymers made with the process disclosed herein comprise at least one —$CH_2I$ terminal group (e.g., at least 2, at least 4, at least 6, at least 8, or even at least 10) and are substantially free of —$CF_2I$ terminal groups. As disclosed herein substantially free of —$CF_2$—I terminal groups means the no $CF_2I$ groups are detectable by standard $^{19}F$ NMR. In other words, the polymer comprises less than 500, 300, 200, 150 or even 100 ppm of —$CF_2I$ terminal groups as compared to all of the fluorine in the polymer. The presence of —$CF_2I$ terminal groups may be detectable by standard $^{19}F$ NMR techniques, searching in the area of −38 to −40 ppm using a $C^{19}FCl_3$ reference, as described by Boyer et al. in Macromolecules, 2005, Vol. 38, 10353-10362.

In one embodiment of the present disclosure, the partially fluorinated polymers disclosed herein comprise 1 or more iodine atoms per polymer chain (e.g., 2, 3, 4, 5 or even more iodine atoms per polymer chain), indicating that the iodine is being incorporated into the fluoropolymer during polymerization.

In one embodiment the polymer of the present disclosure comprises at least 0.05, 0.1, 0.2 or even 0.3% by weight iodine relative to the total weight of the polymer gum. In one embodiment the fluoropolymer gum of the present disclosure comprises at most 0.4, 0.5, or even 0.75% by weight iodine relative to the total weight of the fluoropolymer gum.

The partially fluorinated amorphous polymer of the present disclosure typically have Mooney viscosities (ML 1+10 at 121° C.) of greater than 10, 20, 30, 40, 50, 60, 80, or even 100 units and no greater than 150 units. The Mooney viscosity can be determined, for example, according to ASTM D-1646-07 (2012). The fluoroelastomers may have a monomodal or bi-modal or multi-modal weight distribution.

The partially fluorinated semicrystalline polymer of the present disclosure typically have a melt flow index (MFI) at 265° C., 5 kg, is at least 0.1, 1, 10, 50, or even 100 g/10 min and no greater than 500, 600, 800, or even 1000 g/10 min When using the polyiodides of the present disclosure and in the absence of a cure site monomer, the resulting polymer is a linear polymer that may comprising short chain branching. If cure site monomers are incorporated into the fluoropolymer in order to further improve the peroxide curing properties or the physical properties of the polymer, then the fluoropolymer often comprises long chain branching. Short chain branching (SCB) can be distinguished from long chain branching (LCB) by the length of the branching unit. In particular, short chain branching is present when the molar mass of the branches $M_{br}$ is smaller than the molar mass of entanglements $M_e$ (SCB: $M_{br} < M_e$). As described by Stange et al. in Macromolecules, Vol. 40, 2409-2416 (2007), $M_e$ of TFE/HFP/VDF copolymers is usually around 4000 g/mol. On the other hand, long chain branching is present when the molar mass of the branches $M_{br}$ is larger than the molar mass of entanglements $M_e$ (LCB: $M_{br} > M_e$). The amount of long chain branching can be determined as described below.

The presence of long chain branches in a polymer can be determined by various rheological experiments. For example, the level of branching or non-linearity can be characterized through the long chain branching index (LCBI). The LCBI can be determined as described in R. N. Shroff, H. Mavridis; Macromolecules, Vol. 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br}$ is the zero shear viscosity (units Pa*s) of the branched fluoropolymer measured at a temperature T and $[\eta]_{br}$ is the intrinsic viscosity (units ml/g) of the branched fluoropolymer at a temperature T' in a solvent in which the branched fluoropolymer can be dissolved and a and k are constants. These constants are determined from the following equation:

$$\eta_{0,lin} = k \cdot [\eta]_{lin}^a \qquad \text{eq. 2}$$

wherein $\eta_{0,lin}$ and $[\eta]_{lin}$ represent respectively the zero shear viscosity and intrinsic viscosity of the corresponding linear fluoropolymer measured at the respective same temperatures T and T' and in the same solvent. Thus, the LCBI is independent of the selection of the measurement temperatures and solvent chosen, provided, of course, that the same solvent and temperatures are used in equations 1 and 2. The LCBI of a linear fluoropolymer, which may optionally comprise short chain branching will have a LCBI value of at most about 0.1 and no less than 0. The LCBI of a long chain branched fluoropolymer will have a LCBI value greater than 0.1, 0.2, 0.3, or even 0.4. The LCBI for these polymer may be less than about 5, less than about 2 or even less than about 1.

An alternative method for determining the presence of long chain branches relies on the calculation of critical relaxation coefficients. This method is particularly suitable for unsoluble polymers. As disclosed by Wood-Adams et al. (Macromolecules 2000, 33, No. 20, 7489-7499), when plotting the phase angle δ versus the measurement frequency ω, polymers having long chain branches exhibit a plateau or additional curvature in the function of δ(ω) while linear polymers do not. When the polymer is linear the resulting plot only has a single curvature (compare Stange et al., Macromolecules 2007, 40, 2409-2416, figure 6 were the phase angle was plotted versus the shear modulus instead of the angular frequency ( ) but a similar curve is obtained when plotting the phase angle ( ) versus the angular frequency ( )). The critical relaxation exponent n can be obtained by dividing the phase angle at gel point ($_c$) by 90°, i.e. n=$_c$/90°. The phase angle at gel point ($_c$) is the angle at which, in case of long chain branches being present, the ( )-function plateaus or forms a second curvature, i.e. where the first derivative of the plot has its maximum and/or where the 2nd derivative passes zero. According to Garcia-Franco et al. (Macromolecules 2001, 34, No. 10, 3115-3117), the plateau in the afore-mentioned ( )-function will shift to lower phase angles δ when the amount of LCBs in the polymer increases. The closer n is to 1, the fewer long chain branches are present. The critical relaxation exponent n for the fluoropolymers disclosed herein typically is less than 1 and more than 0. Generally, n will be between 0.3 and 0.92, preferably between 0.35 and 0.85.

Curing

The fluoropolymer of the present disclosure may be cured with peroxide curing agents including organic peroxides. In many cases it is preferred to use a tertiary butyl peroxide having a tertiary carbon atom attached to a peroxy oxygen.

Exemplary peroxides include: 2,5-dimethyl-2,5-di(t-butylperoxy)hexane; dicumyl peroxide; di(2-t-butylperoxyisopropyl)benzene; dialkyl peroxide; bis(dialkyl peroxide); 2,5-dimethyl-2,5-di(tertiarybutylperoxy)3-hexyne; dibenzoyl peroxide; 2,4-dichlorobenzoyl peroxide; tertiarybutyl perbenzoate; α,α'-bis(t-butylperoxy-diisopropylbenzene); t-butyl peroxy isopropylcarbonate, t-butyl peroxy 2-ethylhexyl carbonate, t-amyl peroxy 2-ethylhexyl carbonate, t-hexylperoxy isopropyl carbonate, di[1,3-dimethyl-3-(t-butylperoxy)butyl]carbonate, carbonoperoxoic acid, O,O'-1,3-propanediyl OO,OO'-bis(1,1-dimethylethyl) ester, and combinations thereof.

The amount of peroxide curing agent used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts of fluoropolymer.

In peroxide cure systems, it is often desirable to include a coagent. Those skilled in the art are capable of selecting conventional coagents based on desired physical properties. Exemplary coagents include: tri(methyl)allyl isocyanurate (TMAIC), triallyl isocyanurate (TALC), tri(methyl)allyl cyanurate, poly-triallyl isocyanurate (poly-TAIC), triallyl cyanurate (TAC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and combinations thereof. Another useful coagent may be represented by the formula $CH_2=CH-R_{f1}-CH=CH_2$ wherein $R_{f1}$ may be a perfluoroalkylene of 1 to 8 carbon atoms. Such coagents provide enhanced mechanical strength to the final cured elastomer. They generally are used in amount of at least 0.5, 1, 1.5, 2, 2.5, 3, 4, 4.5, 5, 5.5, or even 6; at most 4, 4.5, 5, 5.5, 6, 7, 8, 9, 10, 10.5, or even 11 parts by weight per 100 parts of the fluoropolymer.

The fluoropolymer compositions can also contain a wide variety of additives of the type normally used in the preparation of elastomeric compositions, such as pigments, fillers (such as carbon black), pore-forming agents, and those known in the art.

Metal oxides are traditionally used in peroxide curing. Exemplary metal oxides include: $Ca(OH)_2$, CaO, MgO, ZnO, and PbO. In one embodiment, the curable fluoropolymer is essentially free of metal oxide (i.e., the composition comprises less than 1, 0.5, 0.25, 0.1, or even less than 0.05 parts per 100 parts of the fluoroelastomer). In one embodiment, the curable fluoropolymer comprises metal oxide. For example, at least 1.5, 2, 4, 5, or even 6 parts metal oxide per 100 parts of the fluoropolymer.

In the present curing process, the fluoropolymer gum, along with the required amounts of peroxide, coagent, and other components, is compounded by conventional means, such as in a two-roll mill, at elevated temperatures. The fluoropolymer gum is then processed and shaped (for example, in the shape of a hose or hose lining) or molded (for example, in the form of an O-ring). The shaped article can then be heated to cure the gum composition and form a cured elastomeric article.

The cured fluoroelastomers are particularly useful as seals, gaskets, and molded parts in systems that are exposed to elevated temperatures and/or corrosive materials, such as in automotive, chemical processing, semiconductor, aerospace, and petroleum industry applications, among others. Because the fluoroelastomers may be used in sealing applications, it is important that the elastomers perform well under compression. Compressive sealing is based on the ability of an elastomer to be easily compressed and develop a resultant force that pushes back on the mating surfaces. The ability of a material to maintain this resultant force as a function of time over a range of environmental conditions is important to long term stability. As a result of thermal expansion, stress relaxation, and thermal aging, the initial sealing forces will decay over time. By determining the retained sealing force, elastomeric materials can be evaluated for their sealing force retention under a range of conditions, particularly under high temperature conditions, such as 200° C., 225° C., 250° C., and even 275° C.

Exemplary embodiments of the present disclosure, include, but are not limited to the following embodiments.

Embodiment 1. A method of making a fluoropolymer comprising: (a) providing an aqueous solution comprising a water soluble polyiodide salt of Formula (I): $M^{+y}[I—I—(I)_n]_y^-$ wherein M is a cation having a valence y, y is an integer of at least 1 and n is an integer of at least 1; and (b) initiating polymerization of a monomer in the aqueous solution, wherein the monomer is a fluorinated monomer.

Embodiment 2. The method of embodiment 1, wherein M is selected from: an alkaline metal, an alkaline-earth metal, ammonium, and combinations thereof.

Embodiment 3. The method of embodiment 2, wherein M is selected from Li, Na, K, Ca, and combinations thereof.

Embodiment 4. The method of any one of embodiments 1-3, wherein the water soluble polyiodine salt is prepared with an iodide salt and elemental iodine.

Embodiment 5. The method of any one of embodiments 1-4, wherein n is 1, 2, or 3.

Embodiment 6. The method of any one of embodiments 1-5, wherein the fluorinated monomer is selected from: tetrafluoroethylene, chlorotrifluoroethylene, hexafluoropropylene, vinylidene fluoride; vinyl fluoride, perfluoroalkoxy alkenes, perfluoro alkyl vinyl ethers, perfluoro alkyl allyl ethers, perfluoroalkoxy vinyl ethers, perfluoroalkoxy allyl ethers, and combinations thereof.

Embodiment 7. The method of any one of embodiments 1-6, wherein monomers polymerized are selected from: TFE and propylene; TFE, propylene, and VDF; VDF and HFP; TFE, VDF, and HFP; TFE and EVE; TFE and BE; TFE, EVE, and BE; and VDF and $CF_2=CFOC_3F_7$; ethylene and HFP; CTFE and VDF; TFE and VDF; TFE, VDF, PMVE, and ethylene; TFE and ethylene; TFE, ethylene, and HFP; TFE, ethylene, and PPVE; TFE, ethylene, HFP, and PPVE; and TFE, VDF, and $CF_2=CFO(CF_2)_3OCF_3$.

Embodiment 8. The method of any one of embodiments 1-7, further comprising initiating polymerization in the presence of a non-fluorinated monomer.

Embodiment 9. The method of embodiment 8, wherein the non-fluorinated monomer is selected from ethylene, propylene, or combinations thereof.

Embodiment 10. The method of any one of embodiments 1-9, further comprising initiating polymerization in the presence of a cure site monomer.

Embodiment 11. The method of embodiment 10, wherein the cure site monomer comprises an iodine, bromine, a nitrile group, a biolefin, a diallyl or divinyl group, or combinations thereof.

Embodiment 12. The method of any one of embodiments 1-11, wherein the aqueous solution further comprises an emulsifier.

Embodiment 13. The method of embodiment 12, wherein the emulsifier is selected from a nonfluorinated emulsifier.

Embodiment 14. The method of any one of embodiments 1-13, wherein the method is substantially free of fluorinated emulsifier.

Embodiment 15. A fluoropolymer obtainable by polymerizing a fluorinated monomer in the presence of a water soluble polyiodide salt of Formula (I): $M^{+y}[I—I—(I)_n]_y^-$ wherein M is a cation group having a valence y, y is an integer of at least 1 and n is an integer of at least 1.

Embodiment 16. The fluoropolymer of embodiment 15, wherein the fluoropolymer is an elastomer.

Embodiment 17. The fluoropolymer of embodiment 15, wherein the fluoropolymer is a semi-crystalline polymer having a melting point no greater than 310° C.

Embodiment 18. The fluoropolymer of any one of embodiments 15-17, wherein the fluoropolymer is partially fluorinated.

Embodiment 19. A partially fluorinated polymer comprising: a polymer chain comprising terminal groups consisting of side groups and end groups, wherein the polymer chain comprises at least one terminal group comprising —$CH_2I$ and is substantially free of terminal groups comprising —$CF_2I$ wherein the partially fluorinated polymer is polymerized in the absence of a diiodo compound of the formula I—Z—I, wherein Z is selected from one of an alkyl group, partially fluorinated alkyl group or a perfluorinated alkyl group.

Embodiment 20. The partially fluorinated polymer of embodiment 19, wherein the polymer chain comprises at least two terminal groups comprising —$CH_2I$.

Embodiment 21. The partially fluorinated polymer of any one of embodiments 19-20, wherein the MFI at 265° C. (5 kg) greater than 0.1 g/10 min and less than 1000 g/10 min.

Embodiment 22. The partially fluorinated polymer of any one of embodiments 19-20, wherein the polymer has a Mooney viscosity greater than 10 (ML 1+10) at 121° C.

Embodiment 23. The partially fluorinated polymer any one of embodiments 19-22, wherein the polymer chain comprises interpolymerized monomers, wherein at least two different monomers are interpolymerized.

Embodiment 24. The partially fluorinated polymer of any one of embodiments 19-23, wherein the polymer chain comprises interpolymerized monomers, wherein the monomers are selected from: TFE and propylene; TFE, propylene, and VDF; VDF and HFP; TFE, VDF, and HFP; TFE and EVE; TFE and BE; TFE, EVE, and BE; and VDF and $CF_2=CFOC_3F_7$; ethylene and HFP; CTFE and VDF; TFE and VDF; TFE, VDF, PMVE, and ethylene; TFE and ethylene; TFE, ethylene, and HFP; TFE, ethylene, and PPVE; TFE, ethylene, HFP, and PPVE; and TFE, VDF, and $CF_2=CFO(CF_2)_3OCF_3$.

Embodiment 25. The partially fluorinated polymer of any one of embodiments 19-24, wherein the polymer chain comprises interpolymerized monomers, wherein at least one of the monomers is VDF.

Embodiment 26. The partially fluorinated polymer of any one of embodiments 23-25, wherein the polymer chain further comprises a cure site monomer.

Embodiment 27. The partially fluorinated polymer of embodiment 26, wherein the cure site monomer is selected from a bromine cure site monomer, a iodine sure site monomer, a nitrile cures site monomer, a bisolefin cure site monomer, a diallyl cure site monomer, a divinyl cure site monomer, or combinations thereof.

Embodiment 28. The partially fluorinated polymer of any one of embodiments 19-27, wherein the polymer is substantially free of an emulsifiers.

Embodiment 29. A curable fluoroelastomer composition comprising the partially fluorinated polymer of any one of embodiments 19-28 and further comprising a peroxide cure system.

Embodiment 30. A cured fluoroelastomer composition comprising the reaction product of a curing reaction between the partially fluorinated polymer and the peroxide cure system of embodiment 29.

Embodiment 31. A shaped article comprising the cured fluoroelastomer composition according to embodiment 30.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, mol=mole; cm=centimeter, hr=hour, min=minute, mm=millimeter, ml=milliliter, nm=nanometer, L=liter, rpm=revolutions per minute, MPa=megaPascals, and wt=weight.

Measurement Methodology

The melt flow index (MFI), reported in g/10 min, was measured according to DIN 53735, at a support weight of 5.0 kg. Unless otherwise noted, a temperature of 265° C. was applied and a standardized extrusion die of 2.1 mm diameter and a length of 8.0 mm was used.

The melting point of the fluoropolymer was determined according to ASTM 4591 by means of Perkin-Elmer DSC 7.0 (Perkin-Elmer Inc., Waltham, Mass.) under nitrogen flow and a heating rate of 10° C./min. The indicated melting points relate to the melting point maximum.

The latex particle size determination was conducted by means of dynamic light scattering (Zetasizer 1000 HAS, Malvern Instruments, Ltd., Worcestershire, UK) in accordance to ISO/DIS 13321. The reported average particle size is the Z-average. Prior to the measurements, the polymer latexes as yielded from the polymerizations were diluted with 0.001 mol/L KCl-solution, the measurement temperature was 20° C. in all cases.

Solution viscosities of diluted polymer solutions were determined usually on a 0.16% polymer solution in methylethylketone (MEK) at 35° C. in accordance to DIN 53726. A Connon-Fenske-Routine-Viskosimeter (Fa. Schott, Mainz/Germany) fulfilling ASTM D 2515 was used for the measurements, the Hagenbach correcture was applied. The reduced viscosities, $_{red}$, were converted into the intrinsic viscosity [ ] using the Huggins equation ($_{red.}$=[ ]+$k_H$×[ ]$^2$×c) and a Huggins constant of $k_H$=0.34.

Mooney viscosities were determined in accordance with ASTM D1646-07. Unless otherwise noted, the Mooney viscosity was determined from compositions containing only fluoroelastomer gum incorporating curatives or the final compound using a 1 minute pre-heat and a 10 minute test at 121° C. (ML 1+10 @ 121° C.).

Molecular weight distributions were determined by means of Size Exclusion Chromatography (SEC) recorded at 25° C. in unstabilized LC grade tetrahydrofuran. The SEC equipment consisted of a Thermo Surveyor LC system with quaternary LC-MS gradient pump, autosampler, UV photodiode array detector (PDA), a PSS SDV precolumn (8×50 mm) and three PSS SDV 5µ columns 10^3, 10^5, 10^7 Angström (8×300 mm) and a Shodex 101 refractive index detector. The SEC-elugrams were evaluated using the WinGPC UniChrom software, Version 8.00 (PSS, Mainz/Germany). The molecular weight distributions in the following are reported relative to a calibration conducted with 12 narrow distributed polystyrene standard samples (PSS Polymer Standards Service, Mainz/Germany) ranging from 1620 g/mol to 7,520,000 g/mol.

A strain controlled ARES rheometer (Rheometry Scientific Inc. Piscataway, N.J.) was used to record the dynamic mechanical data of the fluoropolymer in a frequency sweep experiment at 265° C. The 25 mm parallel plate geometry was used and a strain typically ranging from 1 to 20% was applied. Zero shear viscosities $_0$, reported in Pa·s, were extrapolated using the 4 parameter Carreau fit function of the orchestrator software (version 7.0.8.13).

The long chain branching index LCBI was evaluated as described by R. N. Shroff and H. Mavridis in Macromolecules (1999), 32, 8464-8464 & Macromolecules (2001) 34, 7362-7367. Herein, the values of [ ] from solution viscosity and the $_0$ from melt rheology investigation (at 265° C.) were transformed using the factors a=5.26 and k=2.47e-7.

The iodine content was determined by elemental analysis using combustion ion chromatography consisting of: an autosampler (ASC-240S, Metrohm Inc., Riverview, Fla.), a combustion analyzer (AQF-2100 F with NSX-2100, version 1.9.8 software, Mitsubishi Chemical Analytech Co., Ltd.), a gas absorption unit (GA-210, Mitsubishi Chemical Analytech Co.) and a liquid chromatography system (881 compac IC pro with software under the trade designation "MAGIC NET 2.3", Methrohm Inc.).

$^{19}$F and $^1$H nuclear magnetic resonance (NMR) spectra were recorded with an NMR (trade designation "AVANCE" 400, Broker Corp. Bremen, Germany), 400 MHz, 3000 scans per measurement were usually applied. The polymers were dissolved in acetone-$d_6$ at a concentration of typically 50 mg/ml; chemical shifts are reported using tetramethylsilane (TMS) as reference and in physical units of parts per million (ppm). The "N/10$^4$ C" value is the calculated amount of the structural unit per 10,000 carbon atoms (including the side chain C of HFP). The "N/molecule" is the calculated amount of the structural units per polymer chain calculated with the $M_N$ value and the average mass of a carbon atom of $M_0$=43.8 g/mol.

Press-Cure: 150×150×2.0 mm sheets were prepared for physical property determination by pressing at about 10 MegaPascals (MPa) for 7 minutes at 177° C.

Post-Cure: the press-cured sheets were post-cured by exposure to heat for 2 h at 230° C. in an oven.

Cure rheology tests were carried out using uncured, compounded samples using a rheometer (e.g. Rubber Process Analyzer (RPA) Model 2000 from Alpha Technologies)

in accordance with ASTM D 5289-06 at 177° C., no pre-heat, 30 minute elapsed time, and a 0.5 degree arc, 100 cycles per minute). Both the minimum torque ($M_L$) and highest torque attained during a specified period of time when no plateau or maximum torque was obtained ($M_H$) were measured. Also measured were the time for the torque to increase 2 units above $M_L$ ($t_s2$), the time for the torque to reach a value equal to $M_L+0.5\times(M_H-M_L)$, (t'50), and the time for the torque to reach $M_L+0.9\times(M_H-M_L)$, (t'90).

Post-cured sheets (procedure see above) of the curable composition were used for physical property determination. All specimens were returned to ambient temperature before testing.

Physical Properties; Tensile strength at break, elongation at break, and modulus at 100% elongation were determined according to DIN 53504 using samples cut from the corresponding post-cured sheets using punch knive S2 according to DIN53504. Hardness was measured using ISO 7619-1 with a Type A-2 Shore Durometer.

EXAMPLES

Example 1

An amorphous $TFE_{9.9}/PMVE_{19.8}NDF_{70.3}$ terpolymer having straight linear chain topography was prepared in a polymerization kettle with a total volume of 48.5 L equipped with an impeller agitator system according to the following procedure. The oxygen free kettle charged with 26.0 L deionized water was heated up to 90° C. and the agitation system was set to 240 rpm. The kettle was charged with 956 g perfluoromethylvinylether (PMVE) to a pressure of 7.1 bar absolute, with 466 g vinylidenefluoride (VDF) to 15.1 bar absolute and with 175 g tetrafluorethylene (TFE) to 17.0 bar absolute reaction pressure. The polymerization was initiated by the addition of 100 ml of a 2.0% aqueous ammonium persulfate (APS) solution and a continuous feed of the APS-solution was maintained with a feed rate of 165 ml/hr. As the reaction starts, the reaction temperature of 90° C. was maintained and the reaction pressure of 17.0 bar absolute was maintained by the feeding TFE, VDF and PMVE, into the gas phase with a feeding ratio PMVE (kg)/VDF (kg) of 0.729 and a feeding ratio TFE (kg)/VDF (kg) of 0.221. After 8 min of polymerization time, the aqueous $(NH_4)I_3$ solution was fed into the reactor with a feeding ratio of 0.361 kg of the $(NH_4)I_3$ solution per kg of VDF. This aqueous $(NH_4)I_3$ solution was prepared prior to polymerization by dissolving 16 g of elemental iodine (purity 99.9%; Applichem) together with 18.3 g ammonium iodide (purity ≥99.9%; Sigma Aldrich) into 3 L degassed water. The feeding ratio of the other monomers was maintained. The monomer feed was interrupted by closing the monomer valves when a total feed of 3410 g VDF was reached after 370 min. Then the reactor was vented and flushed with $N_2$ in three cycles.

The resulting polymer dispersion having a solid content of 20.2% and latex particles having 273 nm diameter according to dynamic light scattering was removed at the bottom of the reactor. 3000 ml of the dispersion was freeze coagulated at −18° C. in a refrigerator overnight. After defrosting, the so-obtained sponge-like raw rum was washed five times with deionized water under vigorous agitation and then dried in an oven at 130° C. for 12 hours. The resulting polymer showed the following physical characteristics listed in Table 1 below and the following $^1$H-NMR results shown in Table 2 below.

TABLE 1

| Property | Result |
|---|---|
| reduced viscosity (MEK@35° C.) | 71 ml/g |
| intrinsic viscosity (MEK@35° C.) | 68.5 ml/g |
| Iodine Content | 0.14 mass/mass % |
| ML 1 + 10 @ 121° C. | 28 |
| zero shear viscosity | $2.3 \times 10^3$ Pa · s |
| LCBI | 0.1 |
| $M_N$ by SEC | 157,500 g/mol |
| $M_W/M_N$ by SEC | 1.56 |

TABLE 2

$^1$H-NMR Results

| assignment | $N/10^4$ C. | N/molecule |
|---|---|---|
| —$CF_2$—$CH_3$ | 5.2 | 1.9 |
| (1) —$CF_2$—$CH_2$—I | 3.2 | 1.1 |
| (2) —$CF_2$—$CH_2$—I | 2.9 | 1.0 |
| (3) —$CF_2$—$CH_2$—I | 4.8 | 1.7 |
| —$CF_2$—H | 6.5 | 2.3 |

The $^{19}$F NMR spectrum shows no signal in the region around=−38 to −40 ppm.

Example 2

As described in the following, the polymer of Example 1 was press-cured using a peroxide cure package and various physical properties were measured. In each case, 100 parts of the polymer from Example 1 above were mixed on a two roll mill with the following 30 parts carbon black N-990 available under the trade designation "THERMAX FLO-FORM MEDIUM THERMAL CARBON BLACK N990", ASTM N990 from Cancarb Ltd., Medicine Hat, Alberta, Canada, 3 parts ZnO, 3 parts peroxide sold under the trade designation "TRIGONOX 101-50 pd", AkzoNobel Polymer Chemicals LLC, Chicago, Ill.), and 4.3 parts of TAIL, triallylisocyanurate (70%) available under the trade designation "TAIC" from Nippon Kasei, Japan.

The cure compound was tested for curing rheology and mechanical properties. The test results are reported in Tables 3 and Table 4.

TABLE 3

Rheology

| Property | Result |
|---|---|
| Min | 7 |
| T in ° C. | 177 |
| ML in-lb | 0.7 |
| MH in-lb | 11.9 |
| Tan at $M_L$ | 1.49 |
| Tan at $M_H$ | 0.21 |
| $t_s2$, min | 0.43 |
| t'50, min | 0.53 |
| t'90, min | 0.87 |

TABLE 4

Physical Properties

| Conditions | Value |
|---|---|
| Press cure in min | 7 |
| Press cure in ° C. | 177 |

TABLE 4-continued

| Physical Properties | |
| --- | --- |
| Conditions | Value |
| Post cure in hr | 2 |
| Post cure in ° C. | 230 |
| Property | Result |
| Tensile Strength at Break in MPa | 10.6 |
| Elongation at Break in % | 415 |
| 100% Modulus in MPa | 2 |
| Shore A Hardness | 67 |

Example 3

A semi-crystalline $TFE_{39}/HFP_{11}/VDF_{50}$ terpolymer having straight linear chain topography was prepared in the same reactor as used in example 1. The oxygen free kettle charged with 27.0 l deionized water was heated up to 80° C. and the agitation system was set to 240 rpm. The kettle was charged with 275 g of a 30% aqueous surfactant solution comprising $CF_3$—O—$(CF_2)_3$—O—CHF—$CF_2$—C(O)O$^-$ $NH^{4+}$) prepared as described in U.S. Pat. No. 7,671,112 Hintzer, et al.), 1002 g hexafluorpropene (HFP) to a pressure of 7.1 bar absolute, with 304 g vinylidenefluoride (VDF) to 11.6 bar absolute and with 439 g tetrafluorethylene (TFE) to 15.5 bar absolute reaction pressure. The polymerization was initiated by the addition of 690 g of a 1.5% aqueous ammonium persulfate (APS) solution. As the reaction starts, the reaction temperature of 80° C. was maintained and the reaction pressure of 15.5 bar absolute was maintained by the feeding TFE, VDF and HFP into the gas phase with a feeding ratio HFP (kg)/VDF (kg) of 0.516 and a feeding ratio TFE (kg)/VDF (kg) of 1.221. After 8 min of polymerization time, the aqueous $(NH_4)I_3$ solution was fed into the reactor with a feeding ratio of $(NH_4)I_3$ solution (kg)/VDF (kg) of 0.549. This aqueous $(NH_4)I_3$ solution was prepared in the same way as in Example 1. The feeding ratio of the other monomers was maintained. The monomer feed was interrupted by closing the monomer valves when a total feed of 1176 g VDF was reached after 255 min. Then the reactor was vented and flushed with $N_2$ in three cycles.

The resulting polymer dispersion having a solid content of 10.5% and a latex particles having 50 nm in diameter according to dynamic light scattering was removed at the bottom of the reactor. 3000 ml of the dispersion was passed through a glass column containing DOWEX 650C cation exchange resin (Dow Chemical Co.). Then the dispersion was freeze coagulated at −18° C. in a refrigerator overnight. After defrosting, the so-obtained fine polymer agglomerate was washed five times with deionized water under vigorous agitation and then dried in an oven at 80° C. for 12 hours. The thus obtained polymer showed the following physical characteristics listed in Table 5 below and the following $^1$H-NMR results shown in Table 6 below:

TABLE 5

| Property | Result |
| --- | --- |
| reduced viscosity (MEK@35° C.) | 117 ml/g |
| intrinsic viscosity (MEK@35° C.) | 110 ml/g |
| Iodine Content | 0.16 mass/mass % |
| ML 1 + 10 @ 121° C. | 28 |
| zero shear viscosity | $8.0 \times 10^3$ Pa · s |
| LCBI | 0 |
| $M_N$ by SEC | 151,200 g/mol |
| $M_W/M_N$ by SEC | 1.69 |
| melting point maximum | 115° C. |
| MFI(265/5) | 4.8 g/10 min |

TABLE 6

| $^1$H-NMR Results | | |
| --- | --- | --- |
| Assignment | $N/10^4$ C. | N/molecule |
| —$CF_2$—$CH_3$ | * | * |
| (1) —$CF_2$—$CH_2$—I | 4.1 | 1.4 |
| (2) —$CF_2$—$CH_2$—I | 7.4 | 2.5 |
| (3) —$CF_2$—$CH_2$—I | 0.8 | 0.3 |
| —$CF_2$—H | 4.6 | 1.6 |

* designates that no peak was observed in the $^{19}$F NMR spectrum.

The $^{19}$F NMR spectrum shows no signal in the region around=−38 to −40 ppm.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A method of making a fluoropolymer comprising:
   (a) providing an aqueous solution comprising a water soluble polyiodide salt of Formula (I):

$M^{+y}[I—I—(I)_n]_y^-$ wherein M is a cation having a valence y, y is an integer of at least 1 and n is an integer of at least 1; and
   (b) initiating polymerization of a monomer in the aqueous solution, wherein the monomer is a fluorinated monomer.

2. The method of claim 1, wherein M is selected from: an alkaline metal, an alkaline-earth metal, ammonium, and combinations thereof.

3. The method of claim 2, wherein M is selected from Li, Na, K, Ca, and combinations thereof.

4. The method of claim 1, wherein the water soluble polyiodine salt is prepared with an iodide salt and elemental iodine.

5. The method of claim 1 wherein n is 1, 2, or 3.

6. The method of claim 1 wherein the fluorinated monomer is selected from: tetrafluoroethylene, chlorotrifluoroethylene, hexafluoropropylene, vinylidene fluoride; vinyl fluoride, perfluoroalkoxy alkenes, perfluoro alkyl vinyl ethers, perfluoro alkyl allyl ethers, perfluoroalkoxy vinyl ethers, perfluoroalkoxy allyl ethers, and combinations thereof.

7. The method of claim 1, further comprising initiating polymerization in the presence of a cure site monomer, wherein the cure site monomer comprises an iodine, bromine, a nitrile group, a biolefin, a diallyl or divinyl group, or combinations thereof.

8. The method of claim 1, wherein the method is substantially free of fluorinated emulsifier.

9. The method of claim 1, further comprising initiating polymerization in the presence of a non-fluorinated monomer is selected from ethylene, propylene, or combinations thereof.

10. The method of claim 1, wherein the aqueous solution further comprises a nonfluorinated emulsifier.

* * * * *

UNITED STATES PATENT AND TRADEMARK OFFICE
CERTIFICATE OF CORRECTION

PATENT NO. : 9,556,298 B2
APPLICATION NO. : 14/650091
DATED : January 31, 2017
INVENTOR(S) : Klaus Hintzer et al.

It is certified that error appears in the above-identified patent and that said Letters Patent is hereby corrected as shown below:

On the Title Page

Page 2, Column 2,
Line 11, under "Other Publications", delete "Vinylidenfluoride" and insert -- Vinylidenefluoride --, therefor.

In the Specification

Column 3,
Line 56, delete "2-hydropentafluropropylene)," and insert -- 2-hydropentafluoropropylene), --, therefor.

Column 6,
Line 13, delete "Rf" and insert -- Rf --, therefor.
Line 17, delete "-difluroroethene," and insert -- -difluoroethene, --, therefor.

Column 7,
Line 22, after "formula" insert -- I-Z-I, --.
Line 64, delete "TFENDF/HFP" and insert -- TFE/VDF/HFP --, therefor.

Column 8,
Line 61, after "min" insert -- . --.

Column 10,
Line 36, delete "(TALC)," and insert -- (TAIC), --, therefor.

Column 11,
Line 49, delete "vinylidene fluoride;" and insert -- vinylidene fluoride, --, therefor.

Signed and Sealed this
Eighteenth Day of April, 2017

Michelle K. Lee
*Director of the United States Patent and Trademark Office*

Column 13,
Line 64, delete "Connon-" and insert -- Cannon- --, therefor.
Line 64, delete "-Viskosimeter" and insert -- -Viscometer --, therefor.
Line 66, delete "correcture" and insert -- correction --, therefor.

Column 14,
Lines 44 & 45, delete "compac" and insert -- compact --, therefor.
Line 46, delete "Methrohm" and insert -- Metrohm --, therefor.

Column 15,
Line 18, delete "knive" and insert -- knives --, therefor.
Line 26, delete "NDF70.3" and insert -- /VDF70.3 --, therefor.
Line 35, delete "tetrafluorethylene" and insert -- tetrafluoroethylene --, therefor
Line 50, delete "99.9%;" and insert -- $\geq$99.9%; --, therefor.

Column 16,
Line 8, delete "Pa · s" and insert -- Pa·s --, therefor.
Line 39, delete "TAIL," and insert -- TAIC, --, therefor.

Column 17,
Line 24, delete "hexafluorpropene" and insert -- hexafluoropropene --, therefor.
Line 26, delete "tetrafluorethylene" and insert -- tetrafluoroethylene --, therefor.
Line 64, delete "Pa · s" and insert -- Pa·s --, therefor.

In the Claims

Column 18,
Line 49, in Claim 6, delete "vinylidene fluoride;" and insert -- vinylidene fluoride, --, therefor.